(12) United States Patent
Suzuki

(10) Patent No.: US 8,396,376 B2
(45) Date of Patent: Mar. 12, 2013

(54) OPTICAL RECEIVER CIRCUIT

(75) Inventor: Takayuki Suzuki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 428 days.

(21) Appl. No.: 12/663,478

(22) PCT Filed: Jun. 6, 2008

(86) PCT No.: PCT/JP2008/060465
§ 371 (c)(1),
(2), (4) Date: Jan. 21, 2010

(87) PCT Pub. No.: WO2008/149983
PCT Pub. Date: Dec. 11, 2008

(65) Prior Publication Data
US 2010/0172658 A1 Jul. 8, 2010

(30) Foreign Application Priority Data
Jun. 8, 2007 (JP) .............................. P2007-152968

(51) Int. Cl.
*H04B 10/06* (2006.01)
*H04B 10/00* (2006.01)
(52) U.S. Cl. ........................................ 398/208; 398/171
(58) Field of Classification Search .......... 398/202–214, 398/171
See application file for complete search history.

(56) References Cited

U.S. PATENT DOCUMENTS
2005/0024729 A1* 2/2005 Ockerse et al. ............... 359/603

FOREIGN PATENT DOCUMENTS
| JP | 05-160792 | | 6/1993 |
| JP | 05160792 A | * | 6/1993 |
| JP | 06103222 A | * | 4/1994 |
| JP | 06-103222 | | 12/1994 |
| JP | 2005-130173 | | 5/2005 |
| JP | 2005130173 A | * | 5/2005 |

* cited by examiner

*Primary Examiner* — Kenneth N Vanderpuye
*Assistant Examiner* — Abbas H Alagheband
(74) *Attorney, Agent, or Firm* — Drinker Biddle & Reath LLP

(57) ABSTRACT

In the case in which an input voltage to a comparator COMP reaches (½)×Vcc from initial Vcc in accordance with lowering of the electric potential at a nodal point N1, an output level of the comparator COMP is inverted to make the output level LOW. In the case in which the output level of the comparator COMP is made LOW, a switch for amplifying part SW3 is connected, and an optical receiver circuit 1 makes the shift to a half start-up state. A signal detector circuit SD as well is started up by the connection of the switch for amplifying part SW3. In the case in which an amplifying part 2 is started up, the signal detector circuit SD judges whether a transmission signal is included in an output from the amplifying part 2. In the case in which the signal detector circuit SD shows that a transmission signal is not included, the resetting switch SW2 is connected to reset a capacitor C1.

5 Claims, 11 Drawing Sheets

OPTICAL RECEIVER CIRCUIT

TECHNICAL FIELD

The present invention relates to an optical receiver circuit.

BACKGROUND ART

MOST (Media Oriented Systems Transport) is a standard for vehicle-mounted electronic device network systems for use in multimedia. In MOST, an optical receiver circuit such as FOT (Fiber Optic Transceiver) is used, that receives a signal from an optical fiber to convert it into an electrical signal. With respect to FOT, it is expected to reduce power consumption.

In order to achieve low consumption current, a shutdown function is provided for a conventional optical receiver circuit. In a shutdown function, when a shutdown signal is input from the outside, the system comes into a shutdown state that leads to a state in which its consumption current is reduced. Thereafter, when a shutdown release signal is input from the outside, the shutdown state is released, and the system returns to a normal operational state.

One method for miniaturizing such an optical receiver circuit is proposed in Patent Document 1. In an optical receiver circuit described in Patent Document 1, an output from a photodiode is input to an output stage via a first stage amplifying part, an amplifier, a hysteresis comparator, and a buffer. A bias current is supplied to each circuit element from a bias circuit. When a reset signal transmitted on the basis of an output from the amplifier is input to a shutdown control circuit, the bias circuit comes into a shutdown state. The shutdown control circuit releases the shutdown state of the bias circuit on the basis of an output from the first stage amplifying part.

Patent Document 1: Japanese Published Unexamined Patent Application No. 2005-130173

DISCLOSURE OF THE INVENTION

Problems to be Solved by the Invention

However, in the optical receiver apparatus described in Patent Document 1, because an output current from the photodiode is monitored as a signal for start-up/shutdown of the apparatus, even in the case in which a noise light other than a signal light enters the apparatus, there is a risk that the shutdown state is released, which may cause power consumption.

The present invention has been achieved in consideration of such a problem, and an object of the present invention is to provide an optical receiver circuit capable of reducing its power consumption more than that of the conventional apparatus.

Means for Solving the Problems

In order to solve the above-described problem, an optical receiver circuit according to the present invention includes an amplifying part that amplifies an output signal from a photodiode, a capacitor which is connected to the photodiode via a switch, start-up controlling means for disconnecting a connection between the capacitor and the photodiode with the switch to start up the amplifying part in accordance with a stored charge amount in the capacitor, judging means for judging whether a transmission signal is included in an output from the amplifying part, and resetting means for resetting the capacitor in the case in which the judging means shows that a transmission signal is not included. In addition, a transmission signal is a signal artificially generated, which means that a transmission signal is not an undesired signal such as a noise signal.

In accordance with the optical receiver circuit of the present invention, an optical signal input to the photodiode is amplified by the amplifying part. The start-up of the amplifying part depends on a charge amount stored in the capacitor in accordance with an amount of light received in the photodiode.

In the case in which a normal optical signal is input to the photodiode, a stored charge amount in the capacitor rapidly changes. Therefore, the start-up controlling means starts up the amplifying part to perform an amplifying operation. At this time, in order to prevent the output from the photodiode from flowing to the capacitor, the switch between the photodiode and the capacitor is disconnected, and the signal from the photodiode flows to the amplifying part. The signal flowing inside the amplifying part is input to the judging means, and in the case in which it is judged that a transmission signal is included in the signal, resetting is not performed, and the transmission of the signal through the amplifying part is continuously allowed. That is, in the case in which a normal transmission signal is generated from the photodiode in accordance with the optical signal, the amplifying part is started up.

On the other hand, in the case in which the signal flowing inside the amplifying part is input to the judging means, and a transmission signal is not included in the signal, the resetting means resets the capacitor. That is, in the case in which an undesired signal generated due to a weak noise light or the like entering is input to the capacitor, first, the amplifying part is not started up for a long time because a variation in the stored charge amount in the capacitor is small. Further, even in the case in which the amplifying part is started up, because noise is not a transmission signal, the resetting means resets the capacitor by an instruction from the judging means, and in response to this, the start-up controlling means cuts off the power supply to the amplifying part.

Moreover, in the case in which a great undesired signal such as a surge noise light is input to the photodiode, a stored charge amount in the capacitor rapidly changes and the amplifying part is started up. However, thereafter, because the judging means judges that there is no transmission signal, the resetting means resets the capacitor by an instruction from the judging means, and in response to this, the start-up controlling means cuts off the power supply to the amplifying part.

The power supply to the amplifying part by the start-up controlling means is cut off by resetting the capacitor, and the switch between the photodiode and the capacitor is again connected, to continue the above-described operation.

In this way, in accordance with the optical receiver circuit of the present invention, in the case in which a noise light other than a signal light enters the photodiode, the start-up of the amplifying part is inhibited, and even in the case in which the amplifying part is started up, the power supply is immediately cut off, which makes it possible to reduce its power consumption more than that of the conventional apparatus.

Further, the optical receiver circuit of the present invention further includes an output part that outputs an output signal from the amplifying part to the outside, and the judging means starts up the output part in the case in which the judging means shows that a transmission signal is included. In the case in which the judging means shows that a transmission signal is included, the start-up of the output part is performed, and in the case in which the judging means shows that a transmission signal is not included, the output part is not started up. Therefore, its power consumption is further reduced in structure including the output part.

Further, the photodiode and the amplifying part perform given operations even if these are constantly connected. However, it is more preferable from the standpoint of signal transmitting efficiency that the photodiode and the amplifying part are selectively connected when the photodiode and the capacitor are disconnected. That is, in the optical receiver circuit of the present invention, the above-described switch is a changing-over switch, and at the time of disconnecting the capacitor and the photodiode with the switch, the photodiode and the amplifying part are connected.

Various structures are conceivable as a configuration of the start-up controlling means. However, it is preferable that the start-up controlling means according to the present invention has a switch for amplifying part interposed between the amplifying part and a power supply line, and a comparator to which one end of the capacitor is connected, and connection/disconnection of the switch for amplifying part is controlled by an output from the comparator.

Because an electric potential at the one end changes in accordance with a stored charge amount in the capacitor, and the electric potential is input to the comparator, in the case in which an input level to the comparator reaches a reference level, the switch for amplifying part is connected to perform power supply from the power supply line to the amplifying part, and the amplifying part is started up. In the case in which an input level to the comparator does not reach the reference level, the switch for amplifying part is disconnected not to perform power supply from the power supply line to the amplifying part, and the amplifying part is not started up. For this structure, in this way, it is possible to accurately control the start-up of the amplifying part in accordance with a stored charge amount in the capacitor.

Further, the optical receiver circuit according to the present invention further includes a charge amplifier interposed between the comparator and the photodiode, and the capacitor is interposed between input and output terminals of the charge amplifier. In this case, because the capacitor for performing a start-up judgment composes a part of the charge amplifier, it is possible to generate an input voltage to the comparator by charge-to-voltage conversion by the charge amplifier.

Effect of the Invention

In accordance with the optical receiver circuit of the present invention, it is possible to reduce its power consumption more than that of the conventional apparatus.

DESCRIPTION OF SYMBOLS

Figure 1:
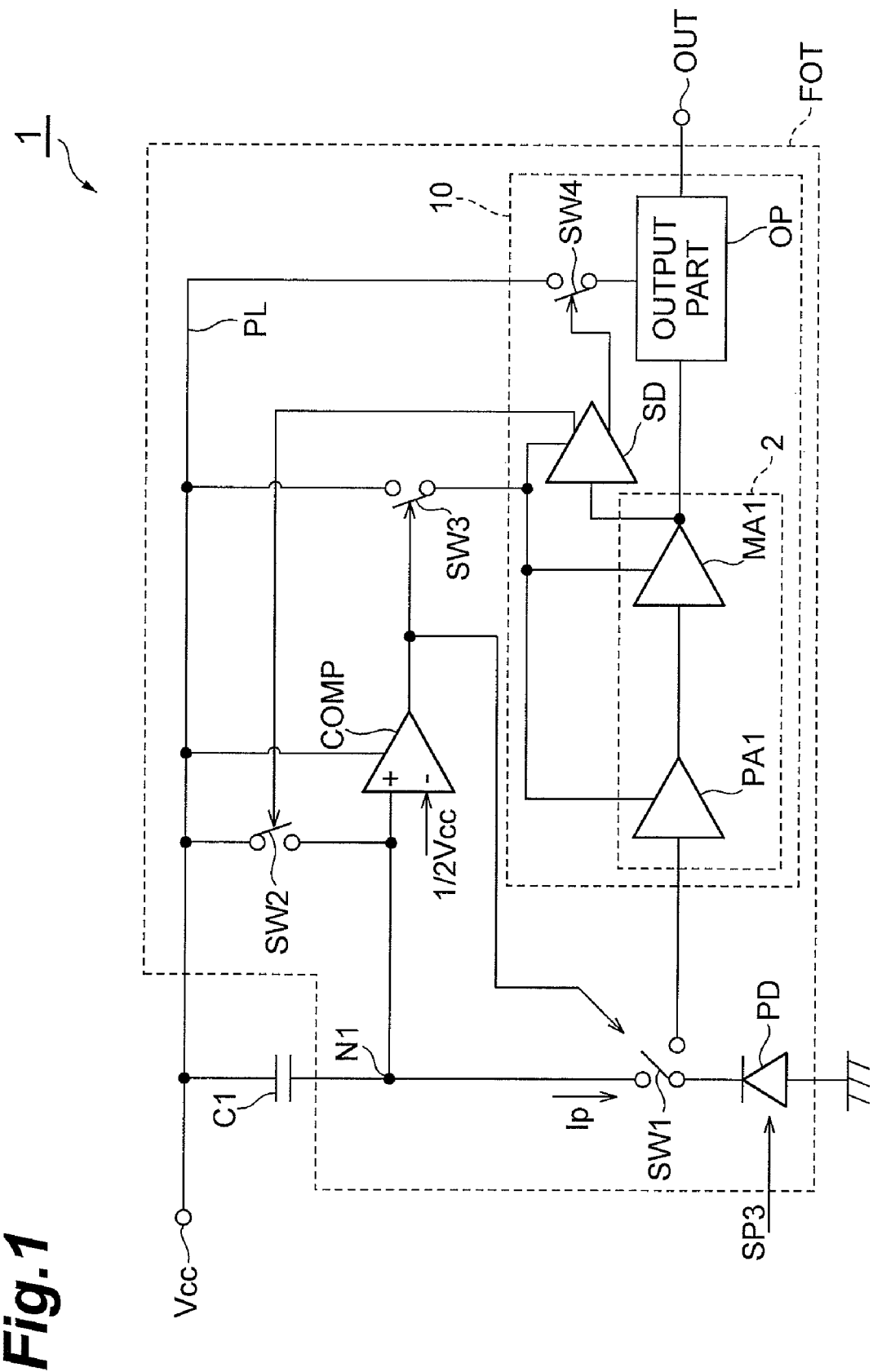
FIG. 1 is a circuit diagram of an optical receiver circuit 1 according to an embodiment.

1: Optical receiver circuit
2: Amplifying part
10: Amplification system circuit
A: Operational amplifier
C1: Capacitor
CA: Charge amplifier
COMP: Comparator
FOT: Fiber optic transceiver
MA1: Main amplifier
N1: Nodal point
OP: Output part
OUT: Signal output terminal
PA1: Pre-amplifier
PD: Photodiode
PL: Power supply line
SD: Signal detector circuit
SP3: Optical signal
SW1: Switch
SW2: Resetting switch
SW3: Switch for amplifying part
SW4: Switch

BEST MODES FOR CARRYING OUT THE INVENTION

Hereinafter, an optical receiver circuit according to an embodiment will be described. In addition, the same reference numerals are used for the same components, and overlapping descriptions will be omitted.

FIG. 1 is a circuit diagram of an optical receiver circuit 1 according to the embodiment.

The optical receiver circuit 1 includes a fiber optic transceiver FOT and a capacitor C1 connected between a terminal (nodal point) N1 and a power supply line PL. A cathode of a photodiode PD is connected to the power supply line PL via the capacitor C1 and a switch SW1 sequentially. An anode of the photodiode PD is connected to fixed electric potential (ground). An output signal from the photodiode PD is selectively input to an amplification system circuit or a detecting system circuit.

The amplification system circuit is composed of a pre-amplifier PA1, a main amplifier MA1, and an output part OP which are sequentially connected, and an output terminal of the main amplifier MA1 is connected to a signal detector circuit (judging means) SD serving as an AC signal monitor as well. The output part OP includes a signal output terminal OUT to the outside as needed. An output from the signal detector circuit SD controls the conducting of a switch SW4 between the output part OP and the power supply line PL. The pre-amplifier PA1 and the main amplifier MA1 compose an amplifying part 2. The amplifying part 2 amplifies an output signal from the photodiode PD.

On the other hand, the detecting system circuit includes a comparator (start-up controlling means) COMP connected to the nodal point N1 between the capacitor C1 and the switch SW1, and a resetting switch (resetting means) SW2 interposed between the nodal point N1 and the power supply line PL to connect both terminals of the capacitor C1. An output from the comparator COMP controls the conducting of a switch for amplifying part SW3 between the power supply line PL and the amplifying part 2, and the conducting of the switch SW1 between the capacitor C1 and the photodiode PD. An electric potential of Vcc is provided for the power supply line PL, and the power supply line PL is connected as a power source for the comparator COMP, and (½)×Vcc as a reference potential is input to the comparator COMP.

Figure 2:
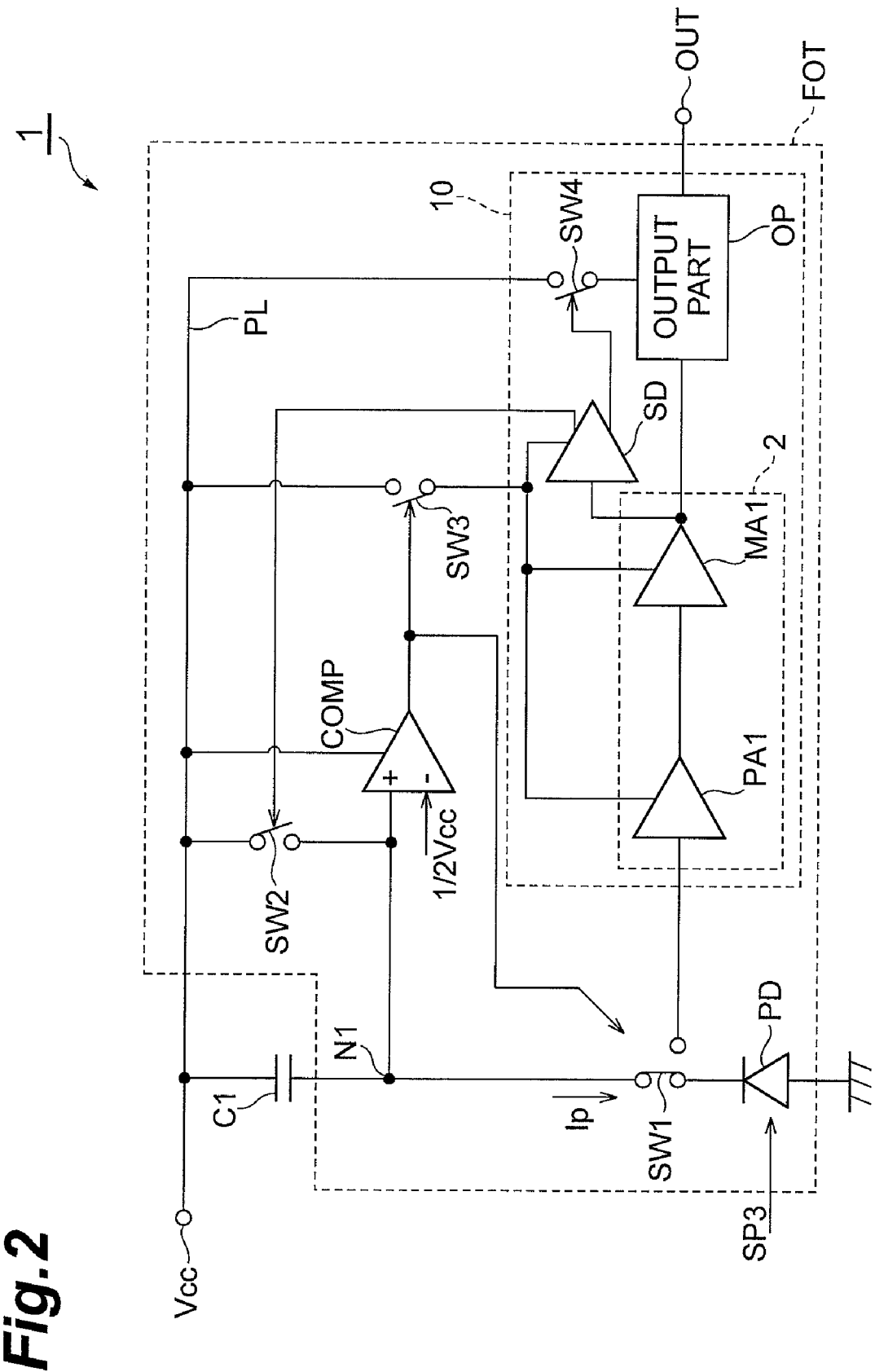
FIG. 2 is a circuit diagram of the optical receiver circuit 1 according to the embodiment (initial state: sleep mode).

FIG. 2 is a circuit diagram of the optical receiver circuit 1 according to the embodiment (initial state: sleep mode).

First, the switch SW1 is connected (ON), and an optical fiber is mounted to the fiber optic transceiver FOT, and an optical signal SP3 enters the photodiode PD from the optical fiber. At this time, an electric current Ip flows inside the photodiode PD. When charges are stored in the capacitor C1 due to an input of light or the like to the photodiode PD, a difference in the electric potentials is generated in both terminals of the capacitor C1.

Because the capacitor C1 is interposed between the power source electric potential Vcc and the ground, when a difference in the electric potentials of both terminals of the capacitor C1 becomes greater, the electric potential at the nodal point N1 positioned therebetween is lowered. The electric potential at the nodal point N1 is to be an input voltage to the comparator COMP. In accordance with lowering of the electric potential at the nodal point N1, the input voltage to the comparator COMP reaches (½)×Vcc from the initial Vcc. During the period when the input voltage to the comparator COMP reaches (½)×Vcc, an output level of the comparator COMP is kept to HIGH level, and the switch for amplifying part SW3 is disconnected (OFF). Accordingly, the amplification system circuit 10 composed of the amplifying part 2, the signal detector circuit SD, and the output part OP is not started up, and in a sleep state.

Figure 3:
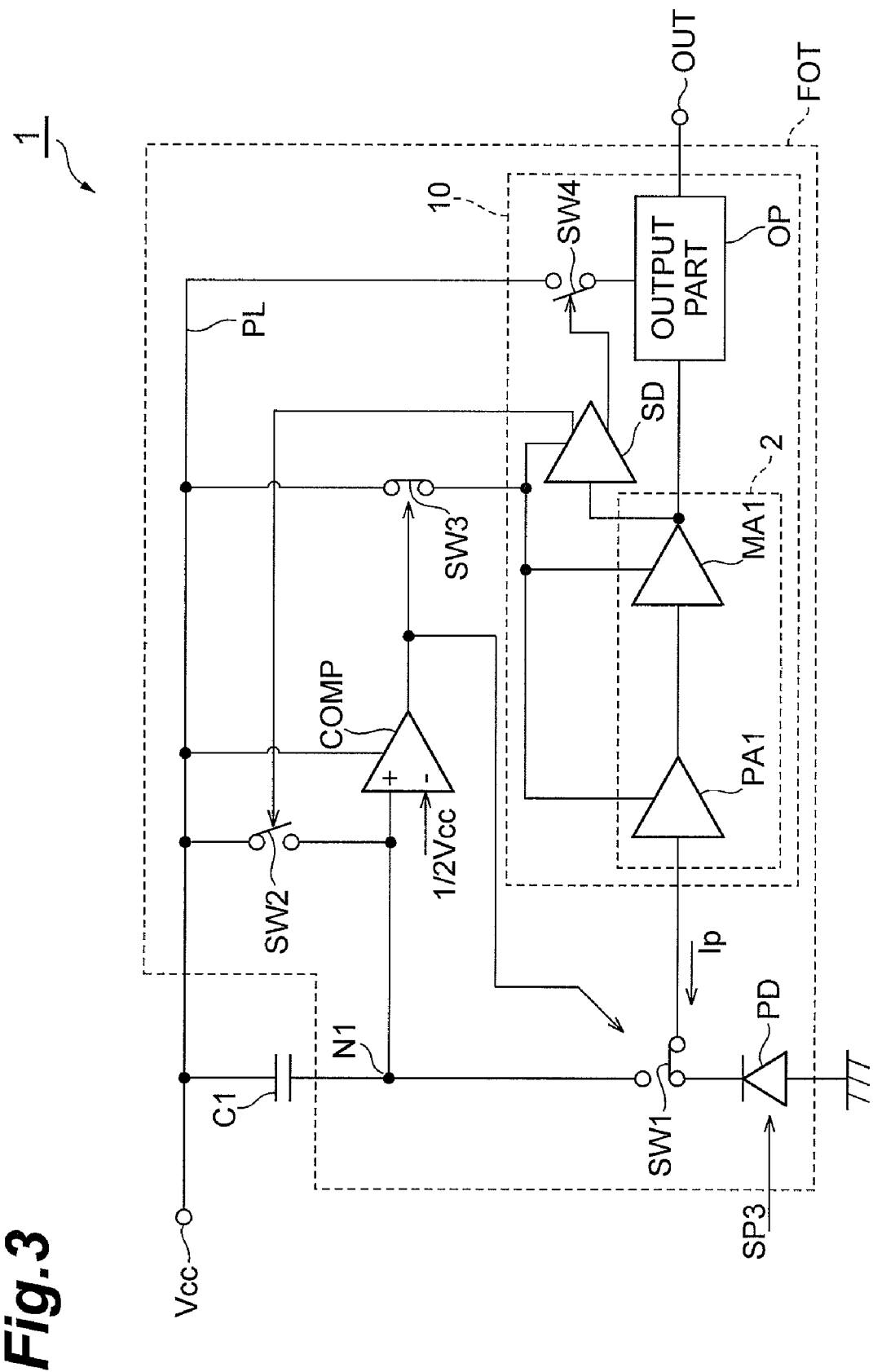
FIG. 3 is a circuit diagram of the optical receiver circuit 1 according to the embodiment (half start-up state).

FIG. 3 is a circuit diagram of the optical receiver circuit 1 according to the embodiment (half start-up state).

In the case in which the input voltage to the comparator COMP reaches (½)×Vcc from the initial Vcc in accordance with lowering of the electric potential at the nodal point N1, an output level of the comparator COMP is inverted to make the output level LOW. In the case in which the output level of the comparator COMP is made LOW, the switch for amplifying part SW3 is connected, and the optical receiver circuit makes the shift to a half start-up state.

In a half start-up state, the switch for amplifying part SW3 is connected, and the switch SW1 is changed over to the amplifying part 2 side. That is, the comparator COMP disconnects the connection between the capacitor C1 and the photodiode PD with the switch SW1, to start up the amplifying part 2 in accordance with a stored charge amount in the capacitor C1. In addition, the signal detector circuit SD as well is started up by the connection of the switch for amplifying part SW3. In this state, the output part OP is not started up yet.

Figure 4:
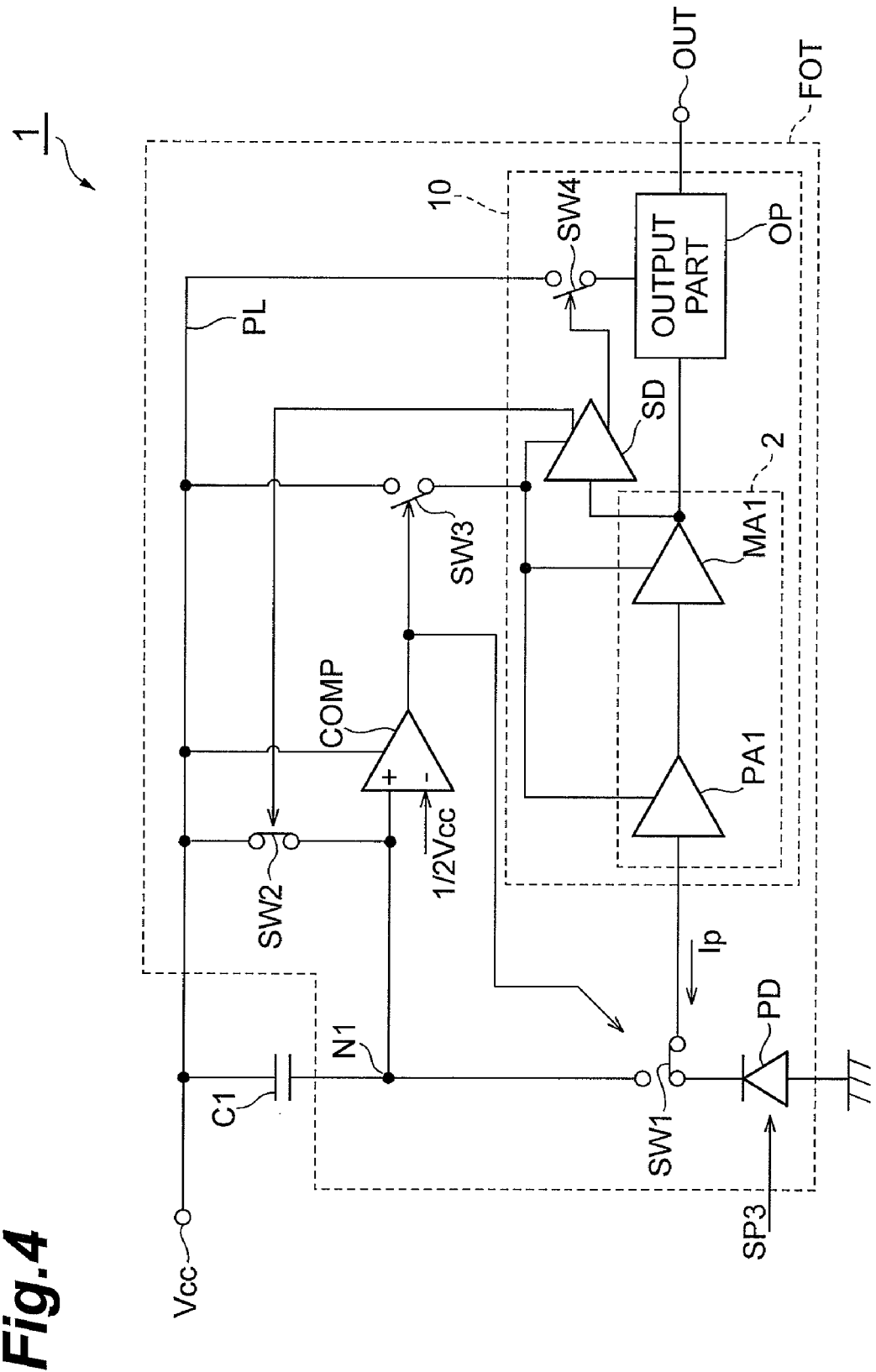
FIG. 4 is a circuit diagram of the optical receiver circuit 1 according to the embodiment (reset state).

FIG. 4 is a circuit diagram of the optical receiver circuit 1 according to the embodiment (reset state).

In the case in which the amplifying part 2 is started up, the signal detector circuit SD judges whether a transmission signal is included in an output from the amplifying part 2. In the case in which the signal detector circuit SD shows that a transmission signal is not included, the resetting switch SW2 is connected to reset the capacitor C1. In addition, a transmission signal is a signal artificially generated with the intention of transmitting, which means that a transmission signal is not an undesired signal such as a noise signal.

The output part OP may be any circuit element to output an output signal from the amplifying part 2 to the outside, that is not particularly limited. The output part OP may be composed of photoelectric conversion elements such as simply an amplifier, a buffer amplifier, or an LED, or a communication circuit and the like.

Figure 5:
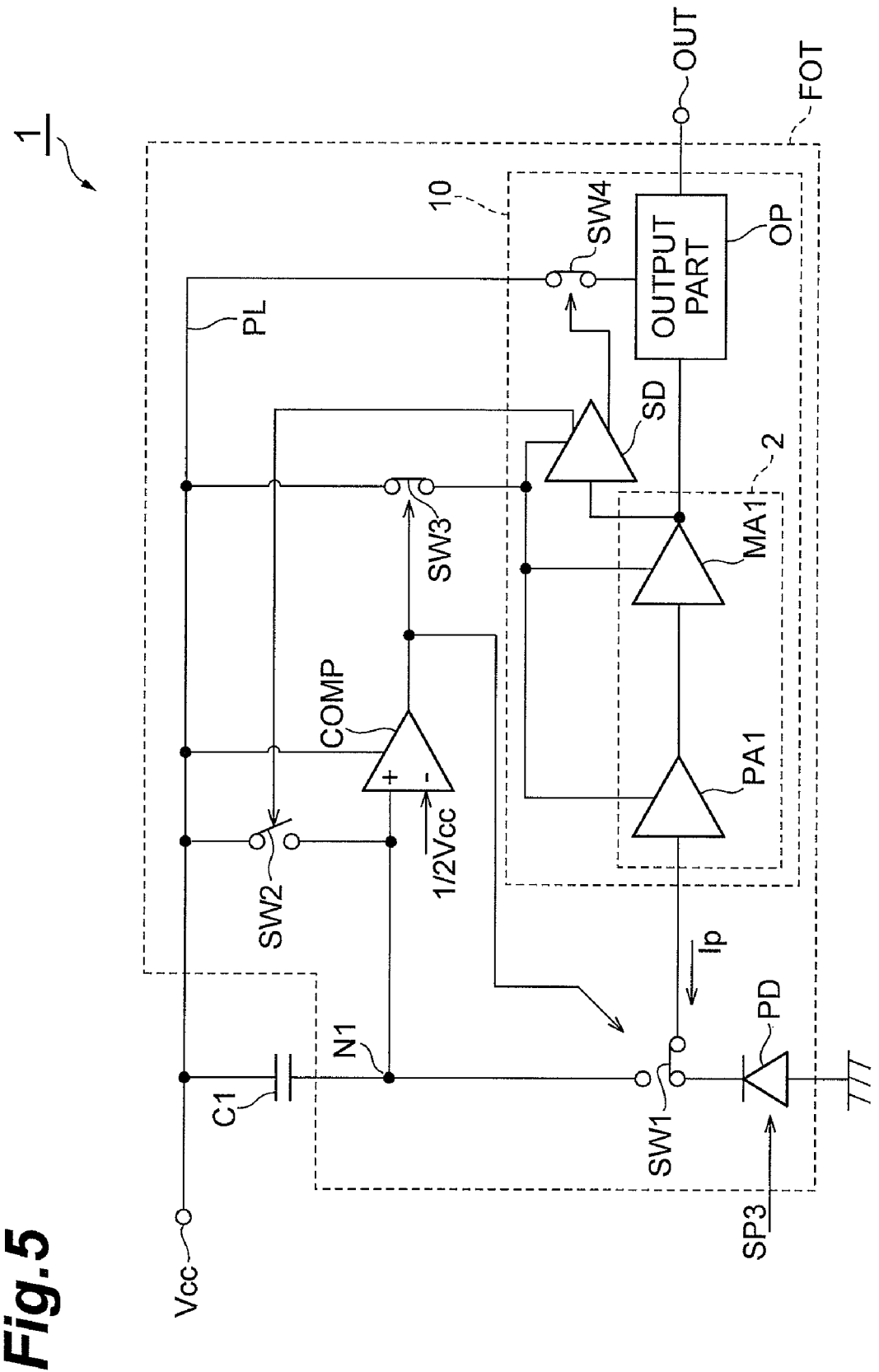
FIG. 5 is a circuit diagram of the optical receiver circuit 1 according to the embodiment (fully start-up state).

FIG. 5 is a circuit diagram of the optical receiver circuit 1 according to the embodiment (fully start-up state).

In the case in which the signal detector circuit SD shows that a transmission signal is included in the signal output from the amplifying part 2, the signal detector circuit SD connects the switch SW4 located between the power supply line PL and the output part OP, to start up the output part OP. In this way, in the case in which the signal detector circuit SD shows that a transmission signal is included, the start-up of the output part OP is performed, and in the case in which the signal detector circuit SD shows that a transmission signal is not included, the output part OP is not started up, which further reduces its power consumption.

Figure 9:
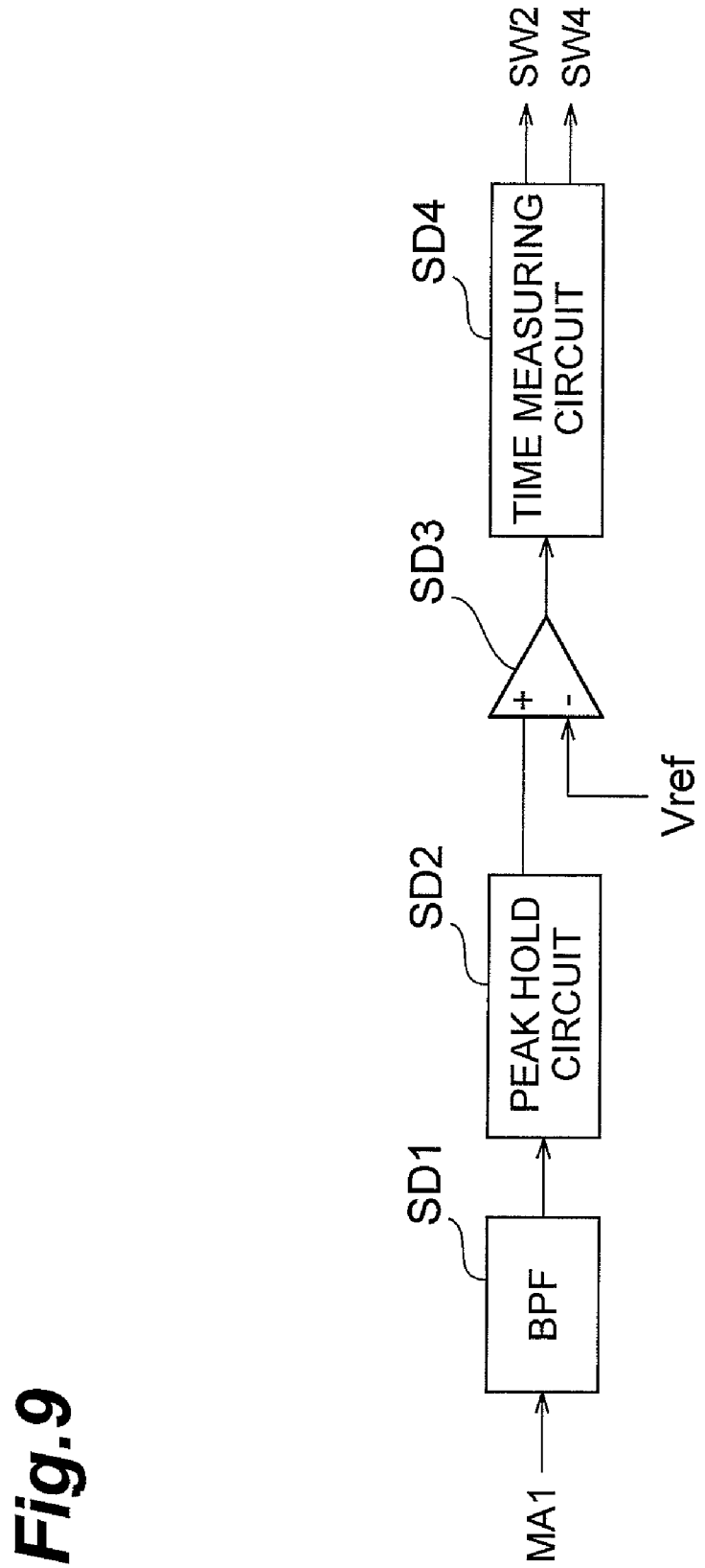
FIG. 9 is a block diagram showing a signal detector circuit SD as an example.

Various configurations are conceivable as the signal detector circuit SD. In the signal detector circuit SD, as shown in FIG. 9 for example, a band-pass filter SD1 and a peak hold circuit SD2 are connected, and only a signal with a specific frequency input from the optical fiber is allowed to transmit through the band-pass filter SD1, and the output at that time is held in the peak hold circuit SD2, and it is detected by the comparator SD3 whether an output potential from the peak hold circuit SD2 is greater than a reference potential Vref. It is measured by the time measuring circuit SD4 whether a state in which the comparator SD3 indicates HIGH level continues for a predetermined period, and in the case in which the state continues for the predetermined period, it is judged that the input signal is not noise (high frequency, low frequency), but a significant transmission signal, to output a start-up signal that turns the switch SW4 ON and turns the switch SW2 OFF. In the case in which the period at HIGH level output from the comparator SD3 is shorter than the predetermined period, it is judged that the input signal is noise, to output a signal inverse of a start-up signal to turn the switch SW4 OFF and turn the switch SW2 ON.

Figure 10:
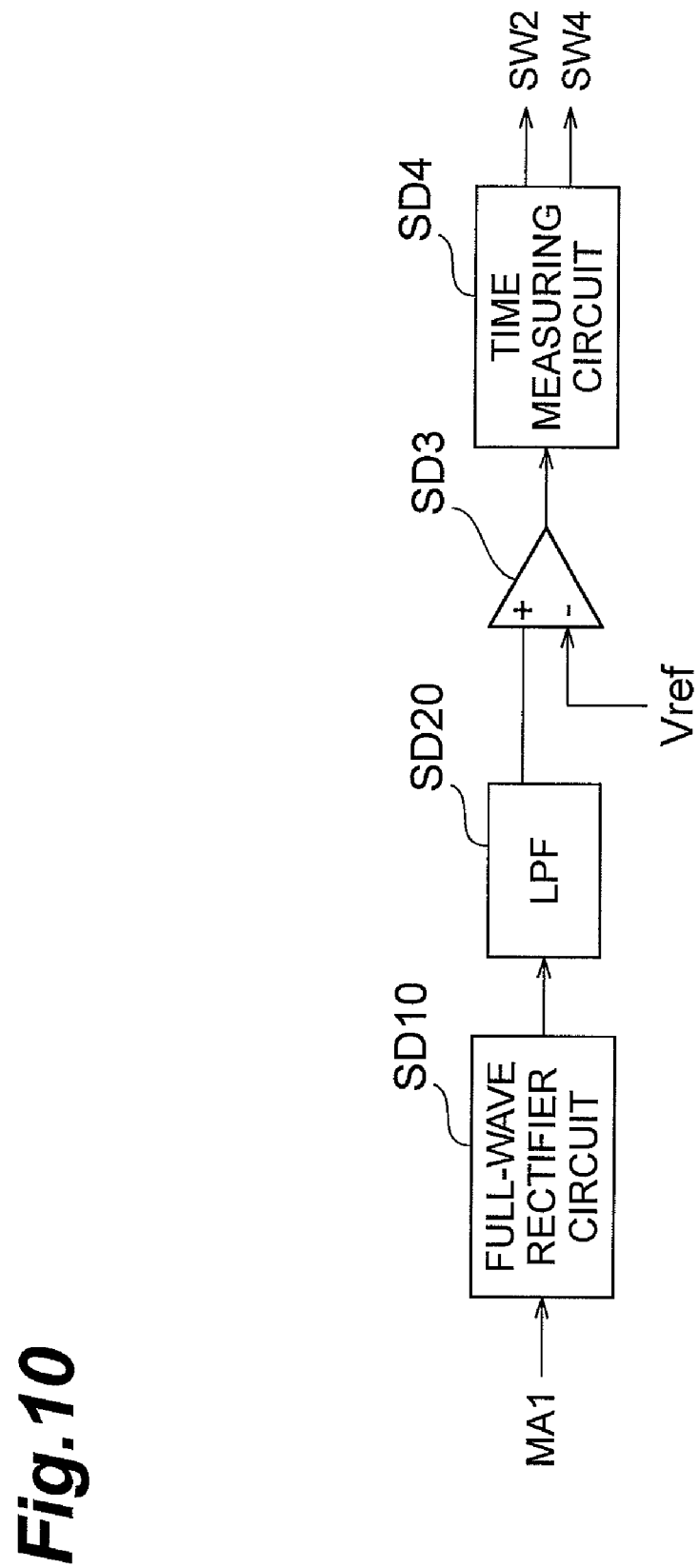
FIG. 10 is a block diagram showing a signal detector circuit SD as another example.

Other structures are conceivable as an example of the signal detector circuit SD. For example, the signal detector circuit SD may be composed of, as shown in FIG. 10, a full-wave rectifier circuit SD10 that performs full-wave rectification of an input signal, a low-pass filter SD20 to which a full-wave rectified signal is input, the comparator SD3 to which an output level smoothed through the low-pass filter SD20 is input, and the time measuring circuit SD4 that outputs a start-up signal that turns the switch SW4 ON and turns the switch SW2 OFF in the case in which an output from the comparator SD3 indicates HIGH level for the predetermined period. A reference potential (threshold value) Vref to be input to the comparator SD3 is set to be greater than or equal to a noise level, and in the case in which a voltage greater than or equal to the reference potential Vref is input to the comparator SD3, the comparator SD3 outputs HIGH level.

Figure 11:
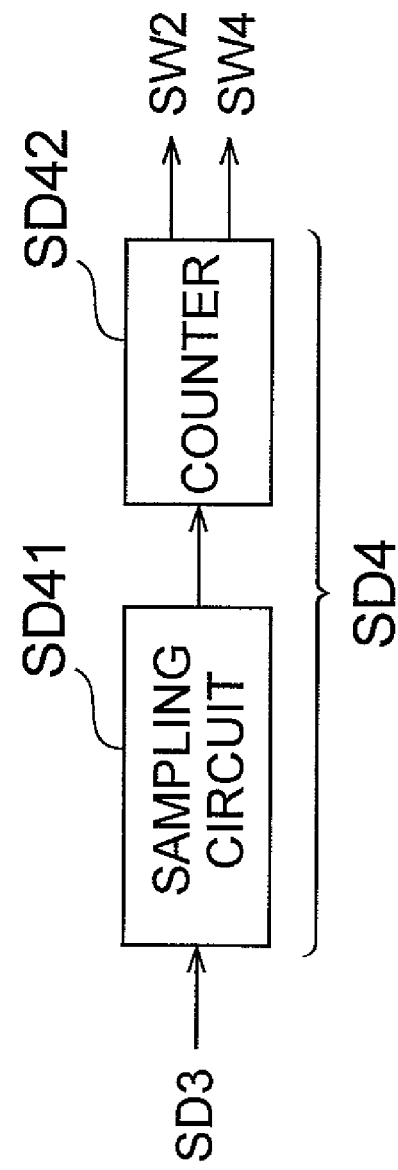
FIG. 11 is a block diagram showing a time measuring circuit SD4.

The time measuring circuit SD4 may be composed of, as shown in FIG. 11, a sampling circuit SD41 that performs sampling of an output of the comparator SD3 in synchronization with a reference clock CLK, and a counter SD42 that outputs the above-described start-up signal in the case in which a number of pulses at HIGH level continuously output from the sampling circuit SD41 reaches N. In order to detect the continuity of signals at HIGH level from the sampling circuit SD41, in the case in which LOW level is output from the sampling circuit SD41, the counted value of the counter SD42 may be reset. The time measuring circuit SD4 may utilize charge and discharge times for the capacitor.

In accordance with the optical receiver circuit 1 described above, the optical signal SP3 input to the photodiode PD is amplified by the amplifying part 2. The start-up of the amplifying part 2 depends on a charge amount stored in the capacitor C1 in accordance with an amount of light received in the photodiode PD.

In the case in which a normal optical signal is input to the photodiode PD, a stored charge amount in the capacitor C1 rapidly changes. Therefore, an output of the comparator COMP starts up the amplifying part 2 to perform an amplifying operation. At this time, in order to prevent the output from the photodiode PD from flowing to the capacitor C1, the switch SW1 between the photodiode PD and the capacitor C1 is disconnected, and the photodiode PD and the amplifying part 2 are connected, which allows the signal from the photodiode PD to flow to the amplifying part 2. The signal flowing inside the amplifying part 2 is input to the signal detector circuit SD, and in the case in which it is judged that a transmission signal is included in the signal, resetting is not performed, and the transmission of the signal through the amplifying part 2 and the subsequent stage circuit is continuously allowed. In the case in which a normal transmission signal is generated from the photodiode PD in accordance with the optical signal, the amplifying part 2 is started up.

On the other hand, the signal flowing inside the amplifying part 2 is input to the signal detector circuit SD, and in the case in which a transmission signal is not included, the resetting switch SW2 is connected by an output from the signal detector circuit SD, and short-circuit between both terminals of the capacitor C1 is caused, to perform resetting. That is, in the case in which an undesired signal generated due to a weak noise light or the like entering is input to the capacitor C1, first, the amplifying part 2 and the signal detector circuit SD are not started up for a long time because a variation in the stored charge amount in the capacitor C1 is small. Further, even in the case in which the amplifying part 2 and the signal detector circuit SD are started up by charging the capacitor C1 sufficiently, because noise is not a transmission signal, the resetting switch SW2 resets the capacitor C1 by an instruction from the signal detector circuit SD, and in response to this, an output from the comparator COMP disconnects the switch SW3 to cut off the power supply to the amplifying part 2.

Moreover, in the case in which a great undesired signal such as a surge noise light is input to the photodiode PD, the stored charge amount in the capacitor C1 rapidly changes, and the amplifying part 2 and the signal detector circuit SD are started up. However, thereafter, because the signal detector circuit SD judges that there is no transmission signal, the resetting switch SW2 resets the capacitor C1 by an instruction from the signal detector circuit SD, and in response to this, the comparator COMP cuts off the power supply to the amplifying part 2 and the signal detector circuit SD.

In addition, the switch SW4 is turned OFF and the switch SW2 is turned ON by cutting off the power supply to the signal detector circuit SD. The switch SW4 and the switch SW2 may be composed of field-effect transistors (FET) of different channel types. However, an inverter may be inserted into a control input of one of FETs of the same channel.

The power supply to the amplifying part 2 and the signal detector circuit SD by the comparator COMP is cut off by resetting the capacitor C1, and the photodiode PD and the capacitor C1 are again connected with the switch SW1, to continue the above-described operation.

In this way, in accordance with the optical receiver circuit of the present embodiment, in the case in which a noise light other than a signal light, which includes a transmission signal enters the photodiode PD, the power supply after the amplifying part 2 and the signal detector circuit SD are started up is inhibited, and even in the case in which these are started up, the power supply is immediately cut off, which makes it possible to reduce its power consumption more than that of the conventional apparatus. In addition, the optical signal providing the above-described transmission signal is a signal whose light intensity per unit time is greater than or equal to a predetermined value, and the light intensity continues for a predetermined period or more.

In addition, the photodiode PD and the amplifying part 2 perform given operations even if these are constantly connected. However, in this example, the photodiode PD and the amplifying part 2 are selectively connected when the photodiode PD and the capacitor C1 are disconnected, which improves the signal transmitting efficiency. That is, the switch SW1 is a changing-over switch, and at the time of disconnecting the capacitor C1 and the photodiode PD with the switch SW1, the photodiode PD and the amplifying part 2 are connected.

Various structures are conceivable as a configuration of the start-up controlling means including the comparator COMP. The start-up controlling means of the above-described embodiment is configured such that the switch for amplifying part SW3 interposed between the amplifying part 2 and the power supply line PL, and the comparator COMP to which one end of the capacitor C1 is connected are provided, and connection/disconnection of the switch for amplifying part SW3 is controlled by an output from the comparator COMP.

In this configuration, because the electric potential at the one end changes in accordance with a stored charge amount in the capacitor C1, the electric potential is input to the comparator COMP. Therefore, in the case in which an input level to the comparator COMP reaches the reference level, the switch for amplifying part SW3 is connected to perform power supply from the power supply line PL to the amplifying part 2 and the signal detector circuit SD, and these are started up. In the case in which an input level to the comparator COMP does not reach the reference level, the switch for amplifying part SW3 is disconnected not to perform power supply from the power supply line PL to the amplifying part 2 and the signal detector circuit SD, and the amplifying part 2 is not started up. In this structure, in this way, it is possible to accurately control the start-up of the amplifying part and the signal detector circuit SD in accordance with a stored charge amount in the capacitor C1.

Figure 6:
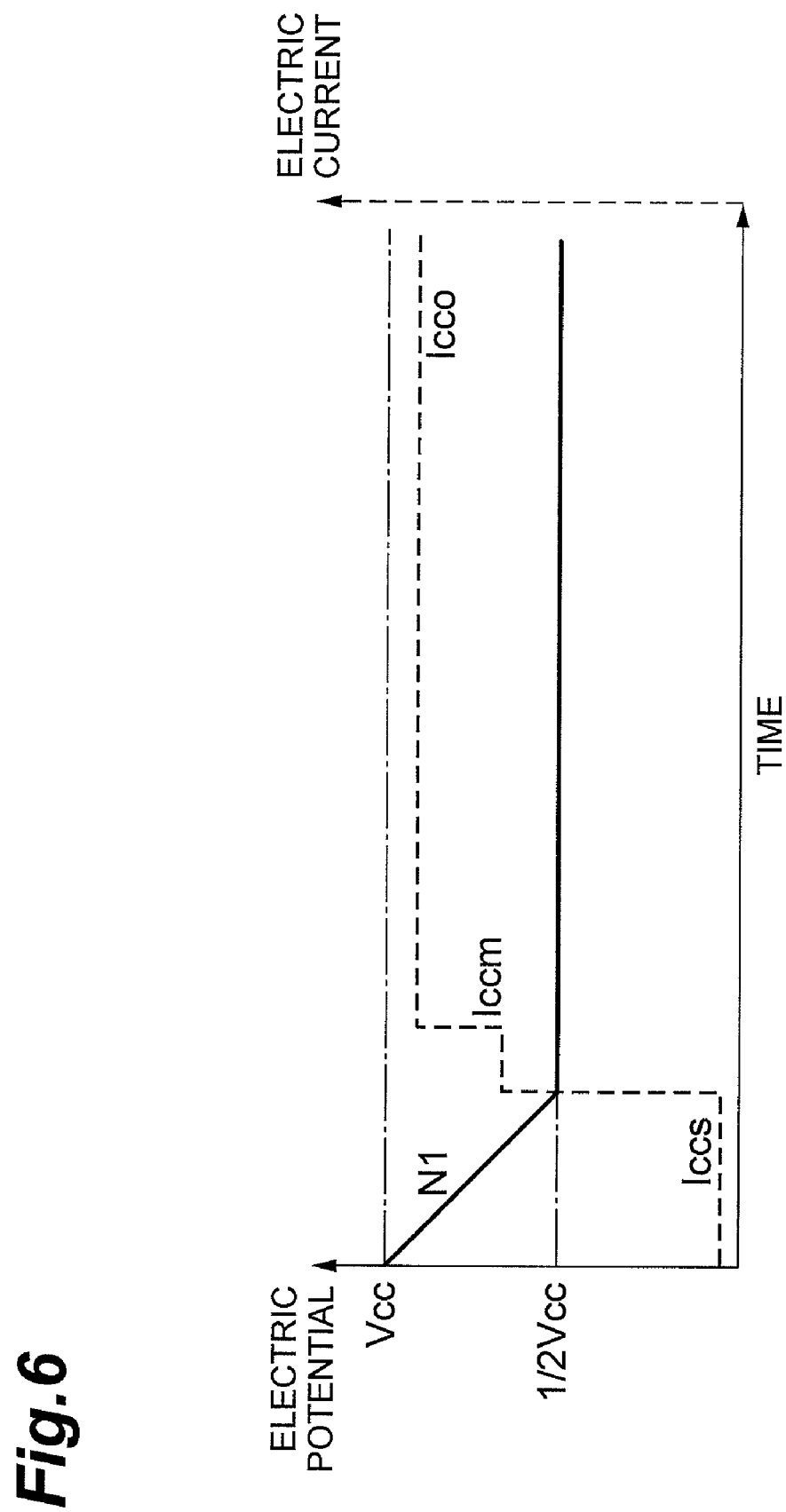
FIG. 6 is a timing chart of electric potential (solid line) at nodal point N1 and consumption current (dotted line) (in optical signal input).

FIG. 6 is a timing chart of electric potential (solid line) at nodal point N1 and consumption current (dotted line) (in optical signal input).

Initially, in the case in which the resetting switch SW2 is connected, the nodal point N1 is connected to the power source electric potential Vcc. In accordance therewith, the power supply to the signal detector circuit SD is cut off via the comparator COMP and the switch SW3, and the resetting switch SW2 is turned OFF, which put the capacitor C1 in a state where a charge is possible. Thereafter, when an optical signal is input to the photodiode PD, a difference in the electric potentials between both terminals of the capacitor C1 increases, and the electric potential at the nodal point N1 is lowered. In the case in which the electric potential at the nodal point N1 is lowered to $(\frac{1}{2}) \times Vcc$, the output from the comparator COMP is inverted to turn the switch for amplifying part SW3 ON. The switch for amplifying part SW3 connects the power supply line PL to the amplifying part 2 and the signal detector circuit SD. Accordingly, the circuit comes into a half start-up state (refer to FIG. 3), and the initial consumption current Iccs increases to Iccm.

When the half start-up state continues for the predetermined period, i.e., when the signal detector circuit SD detects that a transmission signal is included, the switch SW4 is turned ON (the resetting switch SW2 is turned OFF), the output part OP and the power supply line PL are connected, and the output part OP is started up. Accordingly, the consumption current Iccm increases to Icco. On the condition that the optical signal is not noise but a significant signal, the fully start-up state continues. In addition, when the switch SW1 is changed over and the capacitor C1 is isolated from the photodiode PD, an electric potential at the nodal point N1 after the half start-up state is fixed to $(½) \times Vcc$.

Figure 7:
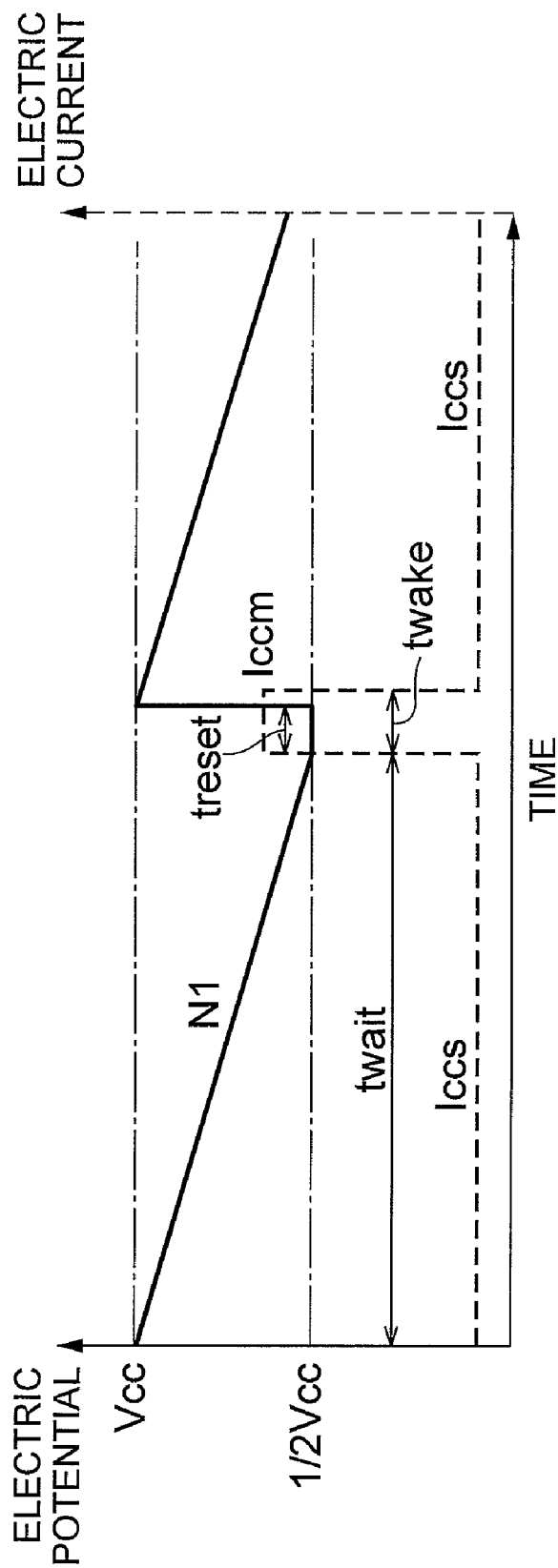
FIG. 7 is a timing chart of electric potential (solid line) at nodal point N1 and consumption current (dotted line) (in noise level input).

FIG. 7 is a timing chart of electric potential (solid line) at nodal point N1 and consumption current (dotted line) (in noise level input).

In the same way as in the above description, initially, in the case in which the resetting switch SW2 is connected, the nodal point N1 is connected to the power source electric potential Vcc. Thereafter, when the capacitor C1 is in a chargeable state and a noise light is input to the photodiode PD, the electric potential between both terminals of the capacitor C1 gradually increases, and the electric potential at the nodal point N1 gradually decreases. In the case in which the electric potential at the nodal point N1 decreases to $(½) \times Vcc$, an output from the comparator COMP is inverted to turn the switch for amplifying part SW3 ON. The switch for amplifying part SW3 connects the power supply line PL to the amplifying part 2 and the signal detector circuit SD. Accordingly, the circuit comes into a half start-up state (refer to FIG. 3), and the initial consumption current Iccs increases to Iccm. In addition, when the switch SW1 is changed over and the capacitor C1 is isolated from the photodiode PD, an electric potential at the nodal point N1 during the period of half start-up state (treset) is fixed to $(½) \times Vcc$.

In the case in which the half start-up state does not continue for a predetermined period (twake), i.e., when the signal detector circuit SD detects that a transmission signal is not included, the switch SW4 is turned OFF (the resetting switch SW2 is turned ON), the output part OP and the power supply line PL are disconnected, and the power supply to the output part OP is cut off. Because an input potential of the comparator COMP is rapidly raised due to the resetting switch SW2 being turned ON, the switch for amplifying part SW3 at the subsequent stage of the comparator COMP is disconnected, and therefore, the consumption current Iccm rapidly decreases to the former Iccs. At this time, because the switch SW1 is connected to the capacitor C1 side, the electric potential at the nodal point N1 starts to gradually decrease again.

Given that a period from the start of the initial state (reset time) to the start of the half start-up state is twait, $twait = C1 \times (½) \times Vcc/Ip$ is expressed. Given that a capacitance of the capacitor C1 is C1 and an electric current flowing in the photodiode PD is Ip, a consumption current Isleep from the time of resetting to the end of the half start-up state in the case in which a significant optical signal is not input, satisfies the following relationship.

$$Isleep = ((Iccm \times twake) + (Iccs \times twait))/(twait + twake) = ((Iccm \times twake) + (Iccs \times (C1 \times (½) \times Vcc/Ip)))/(twake + (C1 \times (½) \times Vcc/Ip))$$

The period twait depends on the photo-electric current Ip flowing in the photodiode PD and the capacitance C1. As an example, the consumption current Iccs in the comparator COMP is 1 µA, and the consumption current Iccm of the entire circuit except for the output part is 15 mA, the capacitance C1 is 100 pF, the photo-electric current Ip is 0.5 µA (average optical input −30 dBm), the period twake is 100 ns which approximately corresponds to the period treset, and the Vcc is 3.3V. In this example, the consumption current Isleep=5.53 µA, and the period twait is 0.33 ms.

Figure 8:
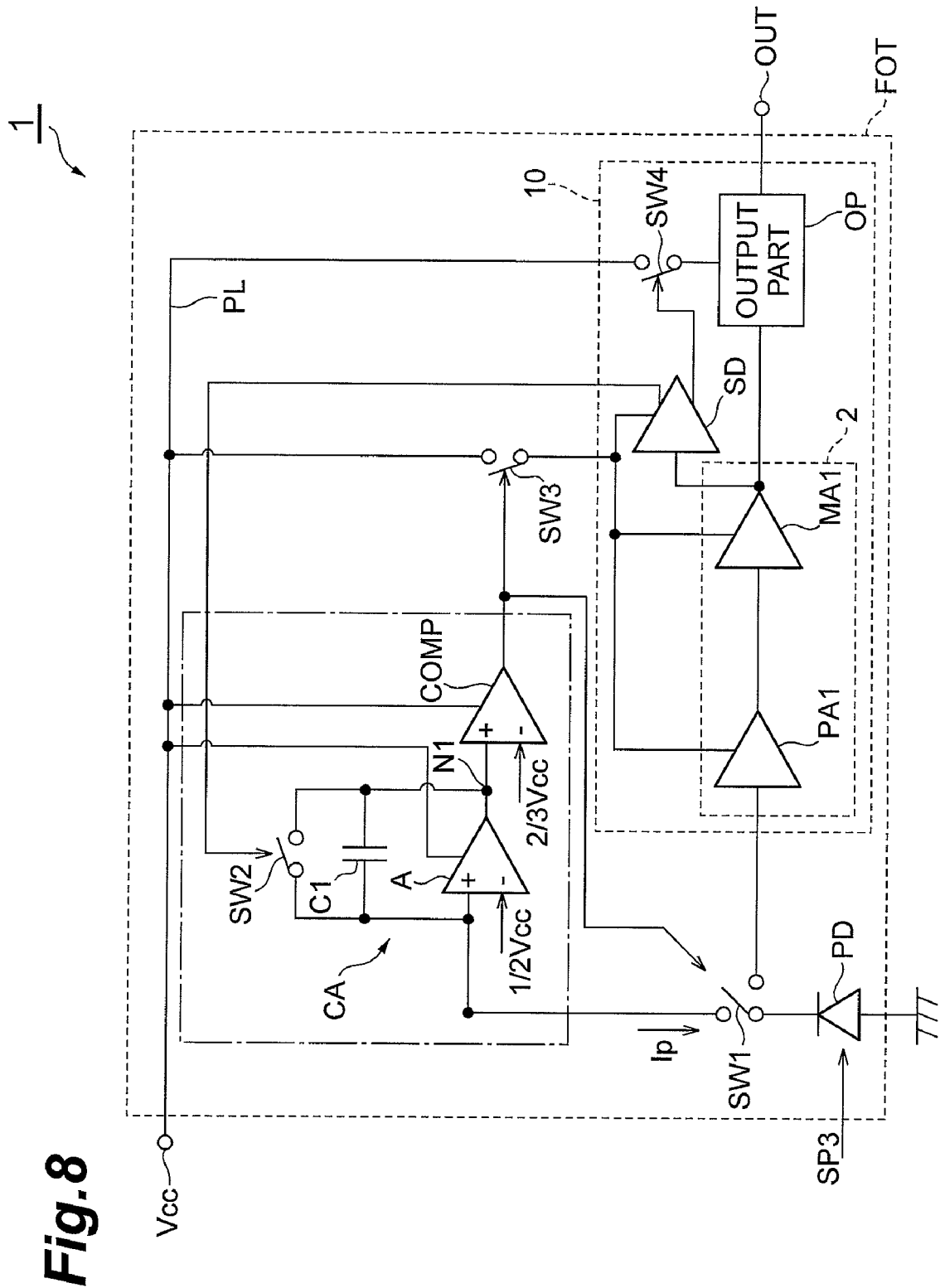
FIG. 8 is a circuit diagram of an optical receiver circuit according to another embodiment.

FIG. 8 is a circuit diagram of an optical receiver circuit according to another embodiment.

In this example, only the connection relationship between the capacitor C1 and the resetting switch SW2 and the point that an operational amplifier A is connected in parallel to the capacitor C1 are different from the above-described embodiment. The other configurations are the same as those in the above-described embodiment. In this optical receiver circuit 1, the configurations of the photodiode PD and the switch SW1, the subsequent stage circuit of the comparator COMP, and the amplification system circuit are the same as those described above. Therefore, descriptions thereof will be omitted.

In the detecting system circuit, the capacitor C1 and the operational amplifier A compose a charge amplifier CA. That is, the optical receiver circuit 1 further includes the charge amplifier CA interposed between the comparator COMP and the photodiode PD, and the capacitor C1 is interposed between the input and output terminals of the charge amplifier CA. In this case, because the capacitor C1 for performing a start-up judgment composes a part of the charge amplifier CA, it is possible to generate an input voltage to the comparator COMP by charge-to-voltage conversion by the charge amplifier CA. In addition, electric power is supplied from the power supply line PL to, not only the comparator COMP, but also the operational amplifier A composing the charge amplifier CA.

A cathode of the photodiode PD is connected to the input terminal of the charge amplifier CA via the switch SW1. The resetting switch SW2 is interposed between the input and output terminals of the charge amplifier CA, and when the resetting switch SW2 is turned ON, the capacitor C1 is reset. The ON/OFF of the resetting switch SW2 is performed by an output from the signal detector circuit SD as described above.

At the time of resetting, the stored charge amount in the capacitor C1 becomes zero. A reference potential of $(½) \times Vcc$ is input to the inverting input terminal of the operational amplifier A composing the charge amplifier CA. Because the electric potential at the non-inverting input terminal at the time of resetting is $(½) \times Vcc$, when negative charges from the photodiode PD flow into the capacitor C1, in the case in which an output potential of the charge amplifier CA is gradually raised, to reach the reference potential $(⅔) \times Vcc$ of the comparator COMP, the output from the comparator COMP is inverted to turn the switch for amplifying part SW3 ON, and the switch SW1 is changed over to the amplifying part 2 side, which brings the circuit into a half start-up state. Because the photodiode PD is disconnected from the capacitor C1 with the switch SW1, in a half start-up state and a fully start-up state, an input potential to the comparator COMP (an electric potential at the nodal point N1) is fixed to the reference potential $(½) \times Vcc$. The following operations are the same as those in the above-described embodiment.

In addition, the reference potential for the charge amplifier CA and the reference potential for the comparator are different in order to reliably disconnect the switch SW3 at the time of resetting. However, values of these reference potentials are not limited to the above-described values.

In accordance with the above-described optical receiver circuit, another photodiode for monitoring is not required, and it is possible to perform detection and amplification with the single photodiode PD. Because the structure of the detecting system circuit is simple, it is possible to reduce a margin of error generated in the entire circuit element at the time of monitoring an optical output, and to reduce consumption current as well.

The invention claimed is:

1. An optical receiver circuit comprising:
    an amplifying part that amplifies an output signal from a photodiode;
    a capacitor which is connected to the photodiode via a switch;
    start-up controlling means for disconnecting a connection between the capacitor and the photodiode with the switch to start up the amplifying part in accordance with a stored charge amount in the capacitor;
    judging means for judging whether a transmission signal is included in an output from the amplifying part; and
    resetting means for resetting the capacitor in the case in which the judging means shows that a transmission signal is not included.

2. The optical receiver circuit according to claim 1 further comprising an output part that outputs an output signal from the amplifying part to the outside, wherein
    an output of the judging means starts up the output part in the case in which the judging means shows that a transmission signal is included.

3. The optical receiver circuit according to claim 1, wherein the switch is a changing-over switch, and at the time of disconnecting the capacitor and the photodiode with the switch, the photodiode and the amplifying part are connected.

4. The optical receiver circuit according to claim 1, wherein the start-up controlling means has a switch for amplifying part interposed between the amplifying part and a power supply line, and a comparator to which one end of the capacitor is connected, and
    connection/disconnection of the switch for amplifying part is controlled by an output from the comparator.

5. The optical receiver circuit according to claim 4 further comprising a charge amplifier interposed between the comparator and the photodiode, wherein
    the capacitor is interposed between input and output terminals of the charge amplifier.

* * * * *

UNITED STATES PATENT AND TRADEMARK OFFICE
CERTIFICATE OF CORRECTION

PATENT NO. : 8,396,376 B2  
APPLICATION NO. : 12/663478  
DATED : March 12, 2013  
INVENTOR(S) : Takayuki Suzuki Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this
First Day of September, 2015

Michelle K. Lee
*Director of the United States Patent and Trademark Office*